(12) United States Patent
Haffray et al.

(10) Patent No.: US 9,850,945 B2
(45) Date of Patent: Dec. 26, 2017

(54) POSITION DETECTION DEVICE OF AMB

(71) Applicants: Bertrand Haffray, Saint-Etienne-du-Rouvray (FR); Olivier Lemarchand, Guichainville (FR)

(72) Inventors: Bertrand Haffray, Saint-Etienne-du-Rouvray (FR); Olivier Lemarchand, Guichainville (FR)

(73) Assignee: SKF MAGNETIC MECHATRONICS, Saint-Marcel (FR)

( * ) Notice: Subject to any disclaimer, the term of this patent is extended or adjusted under 35 U.S.C. 154(b) by 89 days.

(21) Appl. No.: 14/809,576

(22) Filed: Jul. 27, 2015

(65) Prior Publication Data
US 2016/0025518 A1 Jan. 28, 2016

(30) Foreign Application Priority Data

Jul. 28, 2014 (EP) ..................... 14306208

(51) Int. Cl.
F16C 32/04 (2006.01)
G01D 5/20 (2006.01)
G01D 5/22 (2006.01)

(52) U.S. Cl.
CPC ...... *F16C 32/0446* (2013.01); *F16C 32/0455* (2013.01); *G01D 5/2013* (2013.01); *G01D 5/225* (2013.01)

(58) Field of Classification Search
CPC .... G01R 31/024; G01R 23/02; G01R 29/085; G01R 31/1272; G01N 27/026; G01N 33/66; H01L 41/0973; F16C 32/0446; F16C 32/0455; G01D 5/2013; G01D 5/225

USPC ..... 324/207.15, 207.13–207.1, 200, 86, 167, 324/207.25, 654, 76.75, 76.11, 500, 324/750.16, 220

See application file for complete search history.

(56) References Cited

U.S. PATENT DOCUMENTS 3,650,581 A 3/1972 Boden et al.
5,811,695 A 9/1998 Satoh et al.
6,388,548 B1 * 5/2002 Saito ............... H01F 38/18
336/117

(Continued)

FOREIGN PATENT DOCUMENTS

DE 19731433 A1 2/1998
EP 0549911 A1 7/1993

(Continued)

*Primary Examiner* — Melissa Koval
*Assistant Examiner* — Trung Nguyen
(74) *Attorney, Agent, or Firm* — Bryan Peckjian; SKF USA Inc. Patent Dept.

(57) ABSTRACT

A position detection device of active magnetic bearings (AMB's) maintaining the position of a rotating shaft and comprising two sensing inductance coils, the position detection device comprising a programmable digital component for generating a 25 KHz square waveform signal, a current amplifier receiving the 25 KHz square waveform signal and injecting two identical control currents in the two sensing inductance coils, a differential amplifier for amplifying a voltage difference between the resulting voltages in the two sensing inductance coils and, depending on the displacement of the rotating shaft, an analog to digital (A/D) converter for delivering a position value from the voltage difference.

10 Claims, 1 Drawing Sheet

(56) References Cited

U.S. PATENT DOCUMENTS

2010/0194225 A1* 8/2010 Allaire .................. F04D 19/042
                                                           310/90.5
2011/0038091 A1   2/2011 Katzschmann et al.

FOREIGN PATENT DOCUMENTS

KR      20110047339 A    5/2011
WO       2014055848 A1   4/2014

* cited by examiner

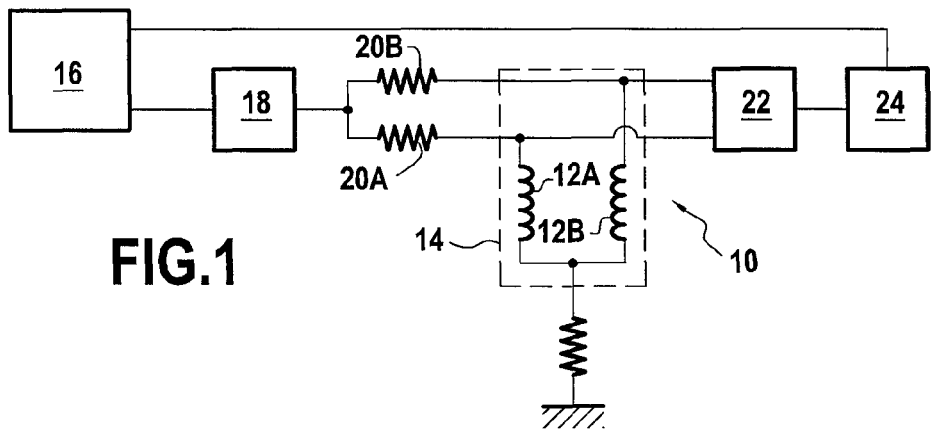
FIG.1
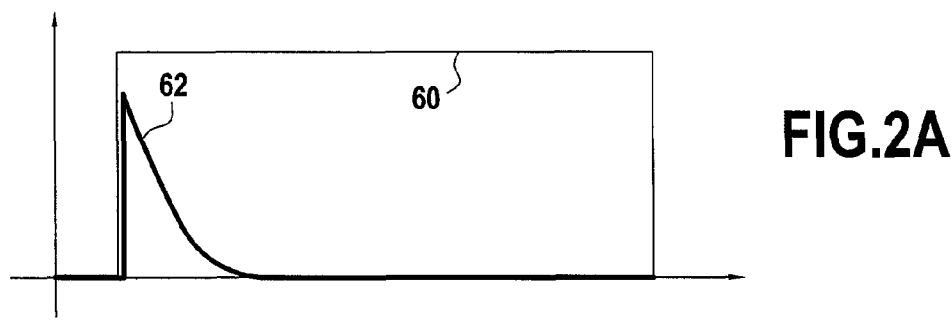
FIG.2A
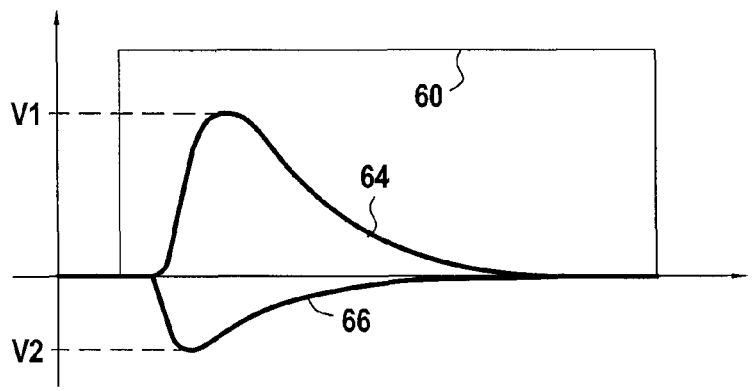
FIG.2B
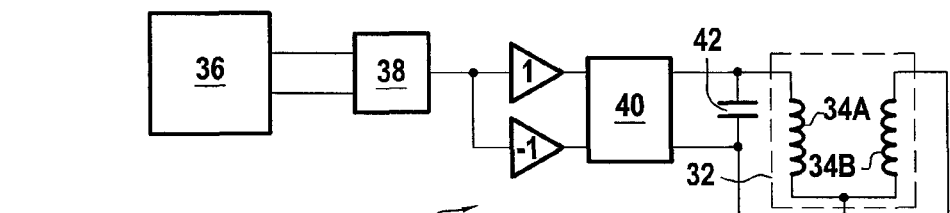
FIG.3
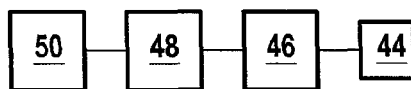
PRIOR ART

POSITION DETECTION DEVICE OF AMB

CROSS REFERENCE TO RELATED APPLICATIONS

This is a Non-Provisional Patent Application, filed under the Paris Convention, claiming the benefit of Europe Patent (EP) Application Number 14306208.1, filed on 28 Jul. 2014, which is incorporated herein by reference in its entirety.

TECHNICAL FIELD

The present invention relates to magnetic bearings and more particularly to a position detection device which is used to obtain the radial or/and axial positions of a rotating shaft in magnetic bearing systems.

PRIOR ART

Magnetic bearings are used in different rotating machines such as electric motors, compressor, turbines or the like in order to maintain the axial or/and radial positions of a rotating shaft by means of magnetic fields acting on a rotor of the machine.

Magnetic bearings are often used to reject disturbances coming from the industrial environment (pressure waves and oscillations) that can create unwanted effects on the behavior of the rotor of the turbine or the compressor such that limit cycles, vibrations, instabilities.

The bearing force is built using a pair of electromagnets connected to power switching amplifiers (classically one power switching amplifier per electromagnet) for which the control voltage is adapted by a controller through a correction network to allow the current to track the set point. The control loop of an active magnetic bearing (AMB) comprises a detector of the position of the rotor assembly.

In one classical solution, a position detection device for detecting the position of a rotor assembly of the AMB includes sensing coils. A signal generator delivers two PWM signals at a 400 KHz frequency, the duty cycle of which varies as a sinus waveform, for a sinusoidal oscillator that generates a 25 KHz sinusoidal signal. This sinusoidal signal and its opposite are delivered to a push-pull power transistor, the two outputs of which are connected with the sensing coils via a tank capacitor disposed in parallel.

The signal received from the sensing coils that contain position information is an amplitude modulated signal depending on the displacement of the rotating shaft. This signal is first filtered and then demodulated with a synchronous demodulator and a low-pass filter. The position of the rotating shaft is finally delivered by an A/D converter receiving the demodulated signal from the low-pass filter.

As previously described, such classical solution uses sinus waveform as oscillator, which generates high power consumption, even if the tank capacitor is tuned to reduce current flowing in the inductance coils. Furthermore, electronics cannot be easily integrated thus providing a quite expensive solution.

SUMMARY OF THE INVENTION

The present invention aims to eliminate the above disadvantages by using an improved position detection device, which authorizes reduced power consumption and further integration benefit.

For this, the position detection device of active magnetic bearings maintaining the position of a rotating shaft and comprising two sensing inductance coils according to the invention comprises:
- a programmable digital component for generating a 25 KHz square waveform signal,
- a current amplifier receiving the 25 KHz square waveform signal and injecting two identical control currents in the two sensing inductance coils,
- a differential amplifier for amplifying a voltage difference between the resulting voltages in the two sensing inductance coils and depending on the displacement of the rotating shaft, and
- an A/D converter for delivering a position value from the voltage difference.

Preferably, the 25 KHz square waveform signal has a duty cycle of 50%.

Advantageously, the current amplifier comprises a Darlington transistor and two resistors connected in series with the two sensing inductance coils.

Preferably, the A/D converter is connected to the programmable digital component to synchronize the conversion with the 25 KHz square waveform signal for obtaining a position value corresponding to a maximal value of the voltage difference.

Advantageously, the programmable digital component consists in a DSP, a microcontroller or a FGPA.

BRIEF DESCRIPTION OF THE DRAWINGS

The invention will be better understood and further details and advantages thereof will appear more clearly in the following description with reference to the accompanying drawings illustrating embodiments of the invention, and in which:

FIG. 1 illustrates a schematic diagram of an improved position detection device of an active magnetic bearing (AMB) according to the invention, FIGS. 2A and 2B show different waveforms signals of the improved position detection device of FIG. 1, and FIG. 3 represents a schematic diagram of a position device of an AMB according to the prior art.

DETAILED DESCRIPTION OF THE PRESENT INVENTION

FIG. 3 illustrates a classical solution of a position detection device 30 for detecting the position of a rotor assembly of an active magnetic bearing (AMB) 32 having sensing coils 34A, 34B. A signal generator 36 delivers two PWM signals at a 400 KHz frequency, the duty cycle of which varies as a sinus waveform, for a sinusoidal oscillator 38 that generates a 25 KHz sinusoidal signal. This sinusoidal signal and its opposite are delivered to a push-pull power transistor 40, the two outputs of which are connected with the sensing coils 34A, 34B via a tank capacitor 42 disposed in parallel.

The signal received from the sensing coils 34A, 34B that contain position information is an amplitude modulated signal depending on the displacement of the rotating shaft. This signal is first filtered 44 and then demodulated with a synchronous demodulator 46 and a low-pass filter 48. The position of the rotating shaft is finally delivered by an analog to digital (A/D) converter 50 receiving the demodulated signal from the low-pass filter.

FIG. 1 shows a block diagram of an improved position detection device of an AMB maintaining the position of a rotating shaft according to the invention.

The position detection device 10 comprises a programmable digital component 16 for generating a 25 KHz square waveform signal (with a duty cycle of 50%) for a current amplifier to which it is connected. Preferentially, the programmable digital component consists in a DSP or a FGPA and the current amplifier in a Darlington transistor 18 and two resistors 20A, 20B connected in series with two sensing inductance coils 12A, 12B of the AMB 14 for injecting in their two identical control currents. The terminals of the two sensing inductance coils constitute the two inputs of a differential amplifier 22 of gain K, the output of which forms the input of an A/D converter 24 delivering a position value corresponding to the position of the rotating shaft.

The operation of the detection device is now described in view of FIGS. 2A and 2B, which represent the initial 25 KHz square waveform signal and signals in the sensing inductance coils and at the output of the differential amplifier.

The 25 KHz square waveform signal (curve 60 of FIGS. 2A and 2B) generated by the programmable digital component 16 is directly injected into the sensing inductance coils 12A, 12B via the current amplifier 18, 20.

At rest (FIG. 2A), the sensing coil voltage has a "pulse" waveform as illustrated by curve 62 and is identical in the two sensing inductance coils (supposing resistors 12A and 12B adapted accordingly). So, the difference elaborated by the differential amplifier 22 is equal to zero (considering the continuous component removed). The position value delivered by the A/D converter 24 is thus equal to zero too (or to a reference position if any).

On operation (FIG. 2B), depending on the displacement of the rotating shaft and according to the variation of the air gap between coil and rotor, a voltage difference between the resulting voltages VA, VB in the two sensing inductance coils 12A, 12B is created and amplified (K(VA−VB)) in the differential amplifier 22. Curve 64 illustrates for example the voltage difference for a positive displacement and curve 66 for a negative displacement. This difference is converted in the A/D converter 24 in a position value. More particularly, this position value (V1 or V2 as illustrated) is measured when the sensing coil voltage is at its maximum value. This is made possible for example by the connection of the A/D converter with the programmable digital component 16, which permits a synchronization of the conversion with the initial 25 KHz square waveform signal.

The invention has been successfully tested in an AMB typically having sensing inductance coils of some tens of μH for measuring the displacement of a rotating shaft up to 1 mm. The Darlington transistor was advantageously a BCV46 of NXP semiconductors Company and the differential amplifier a AD8421 from Analog Devices Company with a gain of 5 that was sufficient to match with a classical A/D converter (AD7685 for example) having an excursion range of 0 to 3.3V. The values of the resistors (typically some hundreds of Ω) are adjusted depending of the sensibility of the sensing inductance coil. Under these conditions, a position value range from −600 μm to 600 μm was determined.

The invention is particularly suitable for active magnetic bearings of important machines like chiller or turbo-expander for example as for active magnetic bearings within smaller systems like HVAC for cars or trucks.

Although preferred embodiments have been shown and described, it should be noted that any changes and modifications may be made therein without departing from the scope of the invention as defined in the appended claims.

What is claim is:

1. A position detection device of active magnetic bearings maintaining the position of a rotating shaft and comprising two sensing inductance coils, wherein the position detection device further comprises:
   a programmable digital component for generating a 25 KHz square waveform signal,
   a current amplifier receiving the 25 KHz square waveform signal and injecting two identical control currents in the two sensing inductance coils,
   a differential amplifier for amplifying a voltage difference between the resulting voltages in the two sensing inductance coils and depending on the displacement of the rotating shaft, and
   an analog to digital (A/D) converter for delivering a position value from the voltage difference,
   wherein the position detection device is adapted to acquire resulting voltages in the two sensing inductance coils,
   wherein the position detection device is adapted to determine the voltage difference between the resulting voltages,
   wherein the position detection device is adapted to amplify the voltage difference between the resulting voltages in the differential amplifier,
   wherein the voltage difference for a positive displacement defines a positive curve,
   wherein the voltage difference for a negative displacement defines a negative curve,
   wherein the position detection device is adapted to convert the voltage difference in the A/D converter into a position value,
   which permits a synchronization of the conversion with the initial 25 KHz square waveform signal.

2. The position detection device of claim 1, wherein the 25 KHz square waveform signal has a duty cycle of 50%.

3. The position detection device of claim 1, the current amplifier further comprising a Darlington transistor and two resistors connected in series with the two sensing inductance coils.

4. The position detection device of claim 1, wherein the A/D converter is connected with the programmable digital component to synchronize the conversion with the 25 KHz square waveform signal for obtaining a position value corresponding to a maximal value of the voltage difference.

5. The position detection device of claim 1, the programmable digital component is integrated within one of a digital signal processor (DSP), a microcontroller or a field-programmable gate array (FGPA).

6. A position detection device of active magnetic bearings maintaining the position of a rotating shaft and comprising two sensing inductance coils, wherein the position detection device further comprises:
   a programmable digital component for generating a 25 KHz square waveform signal,
   a current amplifier receiving the 25 KHz square waveform signal and injecting two identical control currents in the two sensing inductance coils, two resistors connected in series with the two sensing inductance coils, and a Darlington transistor connected to the two resistors, a differential amplifier for amplifying a voltage difference between the resulting voltages in the two sensing inductance coils and depending on the displacement of the rotating shaft, and an analog to digital (A/D) converter for delivering a position value from the voltage difference, wherein the programmable digital component is integrated within one of a digital signal processor (DSP), a microcontroller or a field-programmable gate array (FGPA).

7. The position detection device of claim 6, wherein the 25 KHz square waveform signal has a duty cycle of 50%.

8. The position detection device of claim 6, wherein the A/D converter is connected with the programmable digital component to synchronize the conversion with the 25 KHz square waveform signal for obtaining a position value corresponding to a maximal value of the voltage difference.

9. A position detection device of active magnetic bearings maintaining the position of a rotating shaft and comprising two sensing inductance coils, wherein the position detection device further comprises:

a programmable digital component for generating a 25 KHz square waveform signal, a current amplifier receiving the 25 KHz square waveform signal and injecting two identical control currents in the two sensing inductance coils, two resistors connected in series with the two sensing inductance coils, and a Darlington transistor connected to the two resistors, a differential amplifier for amplifying a voltage difference between the resulting voltages in the two sensing inductance coils and depending on the displacement of the rotating shaft, and an analog to digital (A/D) converter for delivering a position value from the voltage difference, wherein the A/D converter is connected with the programmable digital component to synchronize the conversion with the 25 KHz square waveform signal for obtaining a position value corresponding to a maximal value of the voltage difference.

10. The position detection device of claim 9, wherein the 25 KHz square waveform signal has a duty cycle of 50%.

* * * * *